Dec. 28, 1965    T. W. MOORE    3,226,626
ELECTRICAL CONTROL SYSTEMS
Filed Dec. 15, 1961    4 Sheets-Sheet 3

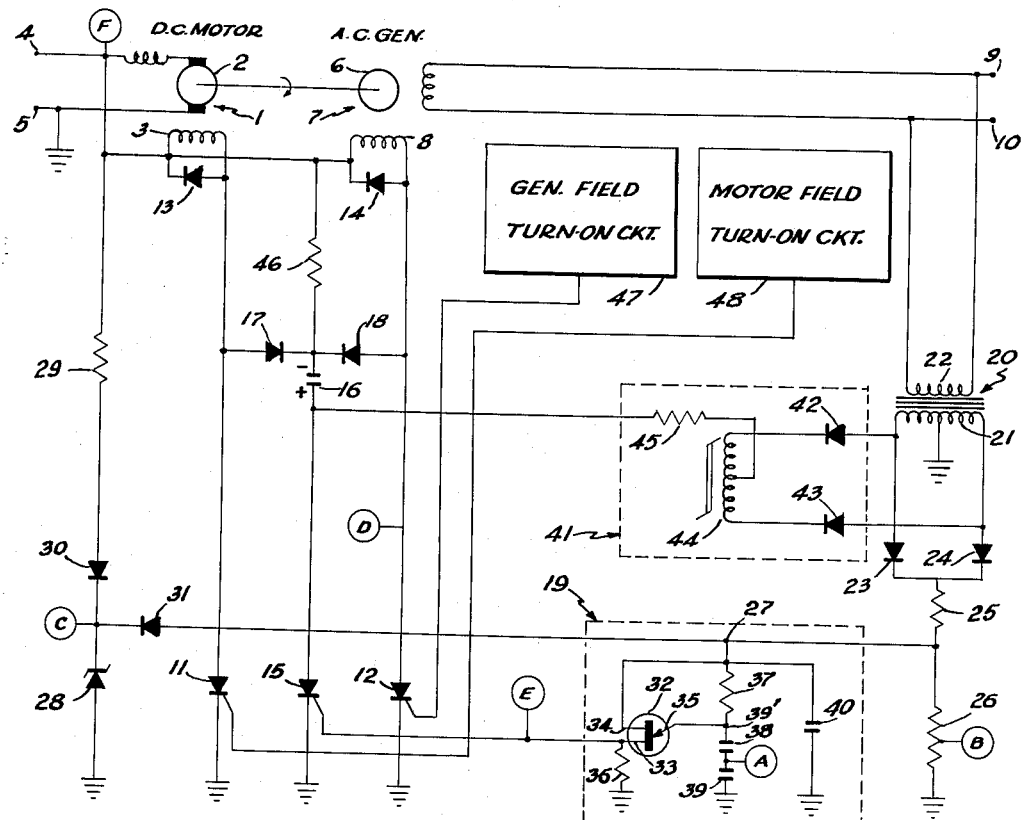

INVENTOR.
THOMAS W. MOORE
BY
Arnold & Roylance
attys.

INVENTOR.
THOMAS W. MOORE

United States Patent Office 3,226,626
Patented Dec. 28, 1965

3,226,626
ELECTRICAL CONTROL SYSTEMS
Thomas W. Moore, Dayton, Ohio, assignor to American Machine & Foundry Company, a corporation of New Jersey
Filed Dec. 15, 1961, Ser. No. 159,541
19 Claims. (Cl. 322—16)

This invention relates to electrical regulating systems and more particularly to regulators for controlling the frequency and voltage of a motor-generator inverter unit.

In many installations, such as in aircraft, it is desirable to have a self-contained source of alternating current power such as can be obtained by a motor-generator inverter operating from a direct current source such as a battery system. Since, in operation of such devices, both the value of the line voltage from the direct current source and the magnitude of the alternating current load can vary over wide ranges and thus tend to seriously affect the potential and frequency of the alternating current output of the inverter, automatic regulation of such devices is highly desirable.

A general object of this invention is to provide a regulator system for a motor-generator inverter which maintains the voltage and frequency of the current output substantially constant regardless of variations in direct current line voltage and/or alternating current load.

Another object is to provide such a regulator system employing reliable solid state elements throughout, these solid state elements being connected to operate in their dependable switching mode.

A further object is to provide a regulator for a motor-generator inverter unit which energizes the field windings of both rotary units from a direct current source rather than from the generator alternating current output.

Yet another object is to provide a regulator of the type described which provides pulse energy to the field windings from the direct current source, the spacing and time duration of these pulses being controlled in accordance with the alternating current output from the generator.

A further object is to provide a regulator circuit employing controlled rectifiers to control energization of the field windings of a motor-generator inverter from a direct current source. The controlled rectifiers are rendered conductive at a selected point during each half-cycle of the alternating current output signal and are rendered nonconductive at or near the completion of each half-cycle, providing an energization pulse of automatically controlled time duration.

Another object is to provide an improved controlled rectifier commutating circuit wherein a capacitor is discharged through an additional controlled rectifier, and the additional controlled rectifier is subsequently commutated by current starvation.

Another object is to provide a timing circuit operative to provide an output pulse just preceding each excursion of an alternating current signal through the zero point. An associated object is to provide a circuit whereby such pulse is employed to actuate a single controlled rectifier which in turn commutates or turns off the controlled rectifiers in each of the voltage and frequency control circuits, while preventing any undesired coupling between those circuits which might cause one of the control circuits to be deactivated when the other is turned on.

A still further object is to provide a regulating system of the type described which includes a synchronizing repetitive proportional time base for providing consistent control on a pulse-time basis and avoiding on-off control for random periods.

Yet another object is to devise a unique frequency responsive circuit capable, for example, of providing a control signal varying in accordance with the frequency of an alternating potential such as that developed as the output of a motor-generator inverter, such circuit being used, in accordance with the invention, to control output frequency in servo fashion by varying the speed at which the generator is driven.

Another object is to provide unique stabilizing circuits for use within a timing circuit employed to control energization of the field windings of a motor-generator inverter in accordance with an error signal.

A further object is to provide a unijunction transistor circuit capable of providing a large energy pulse especially suitable for turning on a controlled rectifier.

In order that the manner in which these and other objects are attained in accordance with the invention can be understood in detail, reference is had to the accompanying drawings, which form a part of this specification, and wherein:

FIG. 1 is a schematic diagram of a regulating system constructed in accordance with one embodiment of the invention for controlling the magnitude and frequency of the output of a motor-generator inverter;

FIG. 3 is a schematic diagram of a modified form of the system of FIG. 1;

Figure 2A:
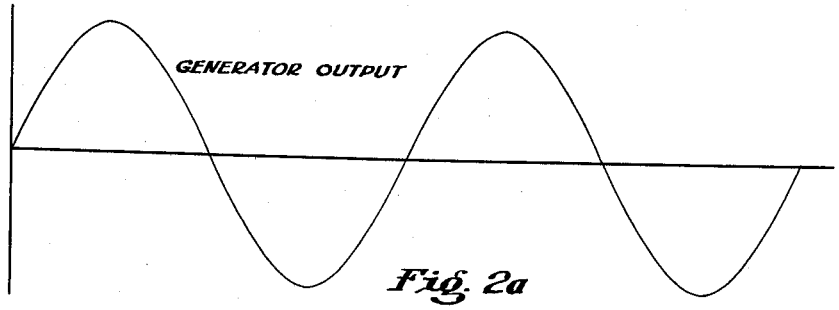
FIGS. 2a–2d are wave form diagrams representing voltages occurring in the system of FIG. 1.

In accordance with the illustrated embodiment of the invention, the regulator circuit for the motor generator inverter unit includes a first controlled rectifier connected in series with the field winding of the motor, and a second controlled rectifier in series with the field winding of the generator. For convenience, the first and second rectifiers are referred to hereafter respectively as the "motor controlled rectifier" and the "generator controlled rectifier," and are operative to control energization of the field windings from a direct current source in on-off fashion. A third controlled rectifier, referred to as the "commutating controlled rectifier," is so connected that, when turned on or fired, it will discharge a capacitor through the motor and generator controlled rectifiers to render them nonconductive. In accordance with one embodiment of the invention, two separate capacitors are employed to turn off, respectively, the motor and generator controlled rectifiers. A saturable reactor connected in series with the capacitor, or capacitors, delays operation of a circuit designed to recharge the capacitors and, in this manner, insures sufficient time for the commutating controlled rectifier to turn off by current starvation.

The circuit which develops a pulse for turning on the commutating controlled rectifier to render the motor and the generator controlled rectifiers nonconductive is referred to hereafter as the turn-off timing circuit. This timing circuit includes a unijunction transistor, and the same alternating current potential from the output of the generator is applied to the emitter element, to charge the emitter capacitor, and to one of the base elements. With this connection, the timing circuit develops an output pulse just preceding the excursion of the alternating current potential through the zero point. Thus, the motor controlled rectifier and the generator controlled rectifier are both turned off to terminate energization from the direct current source at a time just preceding the completion of each half-cycle of the alternating current output potential from the generator.

The generator controlled rectifier is turned on by a pulse developed by a generator field turn-on circuit. This circuit employs a unijunction transistor fired by a charging capacitor and controlled by a transistor shunting the capacitor. The point at which this turn-on circuit develops an output pulse is determined by an error signal developed from the alternating current generator output potential which has been compared with a Zener reference potential, and by a synchronizing signal derived from the turn-off timing circuit. The output pulse from this circuit is developed across a reactor so that there is no substantial output potential under steady-state conditions. The generator field winding energization is initiated at a selected point during each half-cycle of the generator alternating output potential as determined by the turn-on circuit, and this energization is terminated at the completion of each half-cycle by the turn-off circuit. Since the point in time at which the turn-on circuit develops a pulse depends upon the generator output potential, it is apparent that the generator output potential can be controlled in servo fashion by so controlling the time duration of the field energizing pulse.

The motor field turn-on circuit is similar to that for the generator field winding and controls the energization of the motor field winding in accordance with the output frequency from the generator. The frequency sensing circuit which develops an error signal used to control this turn-on circuit includes a full-wave LC circuit and a full-wave RC circuit connected in opposition to derive a direct current error signal which increases with frequency and also develops sufficient current to drive a transistor circuit. Thus, the frequency of the output voltage is controlled in servo fashion by controlling the motor field energization and hence the speed of rotation.

FIG. 1 shows the entire regulator system including the motor-generator inverter, the controlled rectifier circuits, the turn-off circuit and the capacitor charging circuits schematically. The generator field turn-on circuit and the motor field turn-on circuit are shown in block form in FIG. 1 and are described in detail later with reference to FIGS. 4-6.

The direct current motor shown generally at 1 includes an armature connected across a suitable direct current source (not shown) via terminals 4 and 5, and a field winding 3. The direct current motor is mechanically connected to rotate the rotor 6 of an alternating current generator 7 having a field winding 8. Alternating current power is taken off the stationary A.C. stator winding and is supplied to the generator A.C. output terminals 9 and 10. Motor 1 is of the compensated compound type, its speed varying inversely with the current passing through field winding 3. Generator 7 is of conventional single-phase design and provides an output potential varying directly in accordance with the magnitude of current flow through the field winding 8. While a single-phase generator is shown, it is obvious that a three-phase generator could be employed in the same manner by using single phase sensing. With some added complexity in the sensing circuits, multi-phase sensing is feasible.

One side of the motor field winding 3 is connected to the positive terminal of the direct current source via terminal 4, and the other side of the winding is connected to ground via the cathode-anode circuit of motor controlled rectifier 11. One side of the generator field winding 8 is similarly connected to terminal 4, and the other side of this winding is connected to ground via the cathode-anode circuit of generator controlled rectifier 12. A free-wheeling diode 13 is connected across field winding 3, and a free-wheeling diode 14 is connected across field winding 8. When the controlled rectifiers are rendered conductive, current flows from terminal 4 through the field windings and respective controlled rectifiers 11 and 12. Subsequently, when the respective controlled rectifiers are turned off, current flow to ground ceases, but continues through the field winding and associated free-wheeling diode as the magnetic field of the winding collapses.

The circuit employed to turn off the motor controlled rectifier 11 and the generator controlled rectifier 12 includes the commutating controlled rectifier 15 in series with a capacitor 16. With the cathode of the commutating controlled rectifier 15 connected to ground, the series circuit is connected across the motor controlled rectifier 11 by means of diode 17, and is similarly connected across the generator controlled rectifier 12 by diode 18. Diodes 17 and 18 are poled to pass current from the respective motor and generator controlled rectifiers to capacitor 16.

Controlled rectifiers 11, 12 and 15 are of conventional type, normally back-biased and not conductive in either direction. The controlled rectifiers are fired, i.e., turned on or rendered conductive in the forward direction to pass current from the anode to cathode, by providing a positive pulse to the gate element. It will be understood that, once rendered conductive, the controlled rectifier remains conductive even though the pulse applied at the gate element terminates. A controlled rectifier can be turned off subsequently by reducing the current flow therethrough below the holding level, or more rapidly by momentarily reversing the flow of current, i.e., causing current to flow from the cathode to the anode. Assuming that controlled rectifier 11 is conducting, and capacitor 16 is charged with the potential shown in the diagram, controlled rectifier 11 can be turned off by current flowing through controlled rectifier 15, through ground, through controlled rectifier 11 in the reverse direction, and through diode 17 back to the capacitor. Similarly, controlled rectifier 12 is turned off by current flowing from the capacitor through controlled rectifier 15, ground, controlled rectifier 12 in the reverse direction, and diode 18 back to the capacitor. Thus, whenever controlled rectifier 15 is turned on, capacitor 16 is discharged and simultaneously turns off both controlled rectifiers 11 and 12. After controlled rectifiers 11 and 12 become nonconductive, the capacitor is further discharged (including charge to a negative potential) by current flowing from ground through the direct current source, terminal 4 and through the field windings and diodes 17 and 18 back to the capacitor. In this manner, energy from the capacitor aids in energizing the field windings and is not wasted.

The purpose of diodes 17 and 18 is to isolate controlled rectifier 11 from controlled rectifier 12. If it were not for this isolation, the conduction of one controlled rectifier would shunt the other and could conceivably turn off the other controlled rectifier.

Turn-off circuit 19 is employed to provide positive pulses for turning on the commutating controlled rectifier 15. Power is supplied through this circuit by a transformer 20 having a grounded center-tapped secondary winding 21 and a primary winding 22 connected to the output of A.C. generator 7. Diodes 23 and 24 form a full-wave rectifier, having the anodes thereof each connected to a different end of secondary winding 21, and the cathodes thereof connected to ground via the same resistances 25 and 26 connected in series. The signal applied through transformer 20 to junction 27 is a full-wave rectified signal consisting of a series of half sinusoids.

Also connected to junction 27 is a reference potential circuit including Zener diode 28. Zener diode 28 is connected in series with resistance 29 and diode 30 between positive terminal 4 and ground. The Zener diode breakdown potential is normally less than the potential appearing at terminal 4, and therefore current flows through resistance 29, diode 30 and Zener diode 28, establishing a fixed reference potential at the cathode of Zener diode 28. Diode 31 connects the cathode of Zener diode 28 to junction 27 and effectively clamps the potential at that junction and prevents it from ever exceeding the Zener breakdown potential. The half-wave sinusoid signal supplied through transformer 20 has a peak value which exceeds the Zener potential and, therefore, the signal actually appearing at junction 27 is in the form of clipped sinusoids, i.e., a signal which increases sinusoidally until the breakdown potential is reached, is maintained at that reference potential for a certain period of time and subsequently decreases sinusoidally to the end of the half-cycle.

Unijunction transistor 32 is of conventional design and has a base-one element 33, a base-two element 34 and an emitter element 35. The interbase circuit acts as a normal resistance and current flow therethrough establishes a uniform voltage gradient across the transistor. The peak point voltage is established by the emitter between the interbase terminals. Whenever the potential applied at emitter 35 exceeds the peak point voltage, the transistor breaks down and becomes highly conductive from the emitter to base-one 33. It should be noted that transistor 33 can be rendered conductive in the emitter base circuit by decreasing the interbase voltage (which decreases the peak point voltage) or by increasing the emitter potential.

Base-one 33 is connected to ground via resistance 36 and base-two 34 is connected directly to junction 27. Resistance 37 is connected in series with capacitors 38 and 39 between junction 27 and ground. Emitter 35 is connected to the junction 39 between resistance 37 and capacitor 38. Capacitor 40, connected between junction 27 and ground, has a relatively small capacitance value and serves to by-pass the hash on the signal appearing at junction 27, and also provides additional control of the timing of the output pulse.

The operation of the turn-off circuit 19 can best be explained with reference to the wave forms shown in FIGS. 2a, 2c and 2b. The wave form in FIG. 2a is a simple sine wave and represents the alternating current generator output potential appearing at the primary winding 22 of transformer 20. The signal appearing at base-one 34 and at junction 27 in FIG. 1 is shown as the wave form in FIG. 2c, designated as the base potential. This potential increases in accordance with the half-wave sinusoid, then remains constant at the reference potential, and finally decreases again in accordance with the half-wave sinusoid. The same signal applied to base-two 34 is also applied across the series combination of resistance 37 and capacitors 38 and 39 to charge these capacitors. The signal appearing at junction 39, and designated as the emitter potential in FIG. 2c, is a saw-toothed wave. The parameters of the circuit are so selected that capacitors 38 and 39 cannot charge sufficiently to exceed the peak point voltage of the transistor until some time late in the half-cycle. During the last portion of the half-cycle, the potential applied to base-one 34 decreases rapidly and therefor the peak point voltage also decreases rapidly. Eventually, the peak point voltage decreases to a value less than the potential at junction 39′, and therefore transistor 32 breaks down and conducts current which flows through emitter 35, base-one 33, and resistance 36 to discharge capacitors 38 and 39. The spiked output pulse developed across resistor 36 is shown in FIG. 2d. It is essential to note that this output pulse is produced by causing the transistor to fire which, in turn, is caused by decreasing the peak point voltage as the base potential is decreased at the end of each half-cycle. This circuit arrangement makes it possible to obtain very precise control of the firing time, so that it will occur just preceding the completion of each half-cycle. The spiked pulse appearing across resistance 36 is applied to the gate element of commutating controlled rectifier 15 to turn on this controlled rectifier at the conclusion of each half-cycle.

The capacitor charging circuit 41 is employed to supply energy to charge capacitor 16 with the polarity shown. The capacitor charging circuit includes two diodes 42 and 43 each having its anode connected to a different end of secondary winding 21, and its cathode connected to the opposite end of a center-tapped saturable reactor 44. The saturable reactor is so arranged that, when one diode conducts during one half-cycle, the core is driven into saturation in a first direction, and subsequently, when the other diode conducts during the following half-cycle, the core is driven to saturation in the other direction. The center-tap of saturable reactor 44 is connected to the positive plate of capacitor 16 via resistance 45, the negative plate of capacitor 16 being connected to positive terminal 4 via resistance 46. The charging circuit can be completed by connecting resistance 46 to ground instead of to terminal 4, and this will provide adequate performance in some instances. Completion of the circuit to ground, however, will cause a steady-state current component through each field. Thus, in FIG. 1, this current will take the path through field winding 3, rectifier 17 and resistor 46 to ground and will also flow through the parallel path including field winding 8, diode 18, and resistance 46 to ground, both of these paths effectively bypassing the controlled rectifier. This adds to the controllable minimum current and thereby tends to decrease the feasible control ratio.

Returning the circuit to the positive line eliminates the bypassing current but requires that the peak value of the A.C. voltage be higher than the D.C. input voltage by a margin sufficient to charge capacitor 16.

Figure 2B:
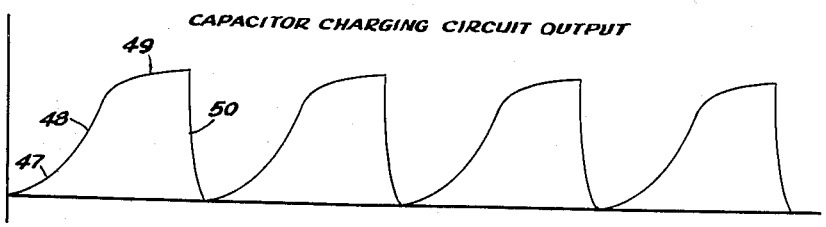
Figure 2C:
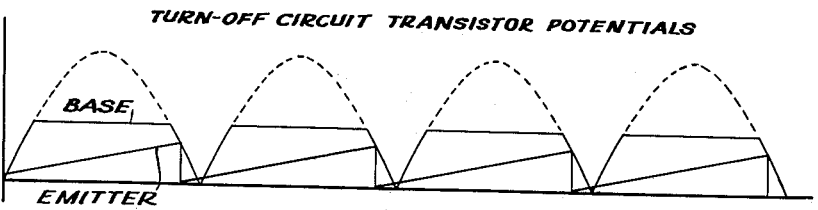
Figure 2D:
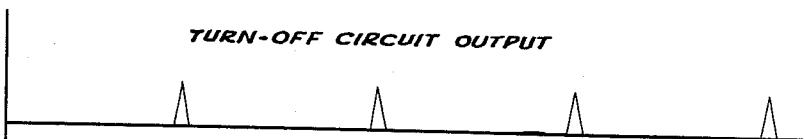

The operation of the charging circuit can best be explained by referring to the wave forms shown in FIGS. 2a and 2b. The output from the alternating current generator is shown in FIG. 2a, and the signal appearing at the positive plate of capacitor 16 is shown in FIG. 2b.

During the first portion of each half-cycle (point 47, FIG. 2b), saturable reactor 44 must first be driven to saturation and therefore, when one of the diodes first begins to conduct, it passes only a very small exciting current and there is no substantial potential applied at capacitor 16. Once reactor 44 has become saturated (point 48, FIG. 2b), the reactance value becomes very low and therefore capacitor 16 charges rapidly, increasing the potential at the positive plate. Subsequently (point 49 on the wave form in FIG. 2b), the capacitor 16 becomes fully charged and therefore there is no further increase in potential. When the commutating controlled rectifier 15 is turned on at the end of each half-cycle (point 50 on the wave form in FIG. 2b), the capacitor very rapidly discharges and the potential at the positive plate of capacitor 16 very rapidly approaches zero. As the next half-cycle begins, the other diode conducts, but the potential at the positive plate of capacitor 16 remains zero for a short time delay until the saturable reactor becomes saturated. The parameters of this circuit are so selected that the positive plate of capacitor 16 remains at approximately zero potential for 150 microseconds, which is a sufficient time to insure that controlled rectifier 15 will turn off by current starvation and no negative pulse current is required.

The generator field turn-on circuit 47 is connected to the generator output potential and determines automatically the appropriate time during the cycle to turn on the generator controlled rectifier 12. The point in time at which this pulse is produced is determined in accordance with the magnitude of the output potential. The time duration at which field winding 8 is energized, i.e., the time between the pulse developed by generator field turn-on circuit 47 and the pulse developed by turn-off circuit 19, varies inversely with the magnitude of the generator output potential. Thus, the generator output potential is controlled in servo fashion by controlling the time duration of the pulse energization of field winding 8.

Motor field turn-on circuit 48 similarly provides pulses for turning on motor controlled rectifier 11. The selected point in time during the cycle at which this circuit produces an output pulse varies in accordance with the frequency of the generator ouput potential. Thus, the speed at which the generator and motor rotate, and hence the output frequency, is established by controlling the time duration of energization of field winding 3.

An alternative circuit for turning off the motor controlled rectifier is shown schematically in FIG. 3. Many of the components in this diagram are similar to those shown in FIG. 1 and therefore similar reference numerals are employed. The essential difference between the circuit shown in FIG. 3 and that shown in FIG. 1 is that two separate capacitors are employed, the circuit of FIG. 3 being a preferred arrangement for larger machines.

A capacitor 60 is arranged with the positive plate thereof connected to the anode of commutating controlled rectifier 15, and the negative plate thereof connected to the anode of the generator controlled rectifier 12 via diode 61. Similarly, capacitor 62 has the positive plate thereof connected to the anode of commutating controlled rectifier 15, and the negative plate thereof connected to the anode of the motor controlled rectifier 11 via diode 63. A resistance 67 is connected between the negative plates of capacitors 60 and 62, and a resistance 64 is connected between the negative plate of capacitor 62 and positive conductor 4. A resistance 66 is connected to the junction between the capacitors connecting this junction to the capacitor charging circuit 41.

When capacitor charging circuit 41 provides an output potential for charging the capacitors, current flows through resistance 66, capacitor 60, resistances 67 and 64 and the direct current power supply to ground, charging capacitor 60 with the polarity shown in the diagram. At the same time, current also flows through resistance 66, capacitor 62, resistance 64 and the direct current power supply to ground, charging capacitor 62 with the polarity shown. Capacitors 60 and 62 are therefore charged to the polarity shown a short time duration after the beginning of each half-cycle in accordance with the wave form shown in FIG. 2b.

The discharge of the capacitors, subsequent to the initial reverse current pulse which commutates controlled rectifiers 11 and 12, occurs at essentially constant current by virtue of the very considerable inductance of the respective field windings. Use of the common commutating capacitor 16, FIG. 1, is convenient because, in general, the condition for maximum motor field energy (maximum D.C. input at no load) corresponds to the condition for minimum alternator field and vice versa. Thus, with the arrangement of FIG. 1, excessive commutating time is avoided for both field windings and the size, weight and cost of the capacitor is minimized and this circuit is preferred when the field impedance is relatively high.

When field currents of several amperes are encountered, it is more advantageous to use separate capacitors, as in the circuit of FIG. 3, in order to improve capacitor cooling and provide a more substantial source of pulse energy separately for each of the controlled rectifiers 11 and 12. The interconnecting resistor 67, of relatively low ohmic value, provides for the mutual interchange of capacitor energy between the two controlled rectifier circuits when the initial reverse current pulse is completed. Thus, the total capacity is effective in both circuits and is appreciably less than would be required if completely separate circuits were utilized to turn off the two controlled rectifiers. The circuit arrangement of FIG. 3 also provides for a minimum field current value substantially less than that which would occur with completely separate capacitor circuits. This in turn results in an improved maximum-to-minimum control ratio and materially extends the range of maximum size to which a given control system constructed in this manner can be applied.

In a rotary motor-generator inverter, it is unusual to have maximum values of current in both field windings simultaneously. The maximum current in the motor field winding occurs at minimum generator load and maximum input line potential. The maximum current in the generator field winding occurs when the load is at a maximum and the input voltage is at a minimum. Thus, it is very unlikely that both field windings will be drawing maximum current and therefore it is desirable to connect capacitors 60 and 62 to aid one another in turning off the controlled rectifier carrying the maximum current. This is accomplished by permitting current to flow from one capacitor to the other capacitor's discharge circuit by means of resistance 67. This interconnecting circuit greatly reduces the size of capacitors 60 and 62 required to turn off both controlled rectifiers under maximum conditions.

Figure 4:
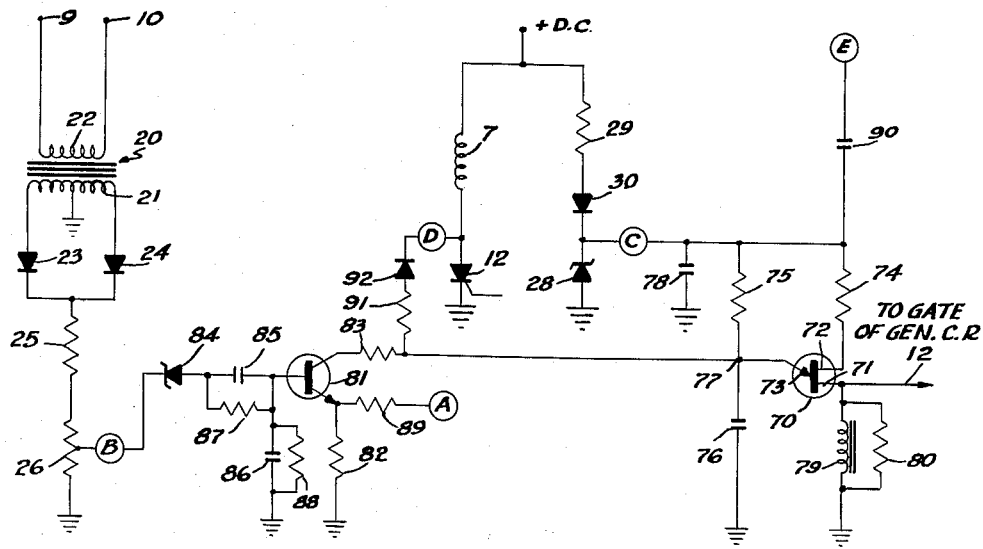
FIGS. 4 and 5 are detailed schematic diagrams of circuits shown in block form in FIG. 1.

The generator field turn-on circuit is shown in detail schematically in FIG. 4. The purpose of this circuit is to provide a pulse for turning on the generator controlled rectifier at a selected point during each half-cycle and so provide a pulse of energy for the generator field winding which is initiated when the generator controlled rectifier is turned on, and is subsequently terminated when the generator controlled rectifier is turned off. It is desirable that the pulse from the generator field turn-on circuit advance, appearing earlier during the half cycle, as the generator output voltage decreases. As this occurs, it should be noted that the pulse duration of the generator field winding is increased and therefore the output voltage tends to increase. Similarly, as the generator output voltage increases, the pulse from the generator field turn-on circuit should appear later in the half-cycle to decrease the field winding energization and the generator output potential.

The generator field turn-on circuit includes a unijunction transistor 70 have a base-one element 71, a base-two element 72 and an emitter 73. The series circuit of Zener diode 28, diode 30 and resistance 29, previously described in FIG. 1 and repeated in FIG. 4, provides a fixed supply voltage at the junction between the diodes. Base-two element 72 is connected to this junction via resistance 74 and connection C. The series circuit of resistance 75 and capacitor 76 is connected across the fixed source of potential, and emitter 73 is connected to junction 77 between resistance 75 and capacitor 76. Capacitor 78 is connected across the fixed source of potential to filter unwanted hash from the signal. The base-one element 71 is connected to ground via inductance 79, a resistance 80 being connected in parallel with the inductance.

A unijunction transistor establishes a peak point voltage in accordance with the D.C. voltage level in the interbase circuit between base-one 71 and base-two 72. Whenever the potential applied to emitter 73 exceeds the peak point voltage, the transistor breaks down and conducts the current from the emitter through base-one 71 to ground. Once resistor 74 and 75 are connected to a source of potential, a peak point voltage is established and capacitor 76 begins to charge. When capacitor 76 charges sufficiently to provide an emitter voltage which exceeds the peak point voltage, capacitor 76 discharges and current flows from the capacitor through emitter 73 and base-one 71 to ground through inductance 79. The values of resistance 75 and capacitor 76 are so selected that the charging time for the capacitor in this series circuit is very short compared to the time duration of a half-cycle from the generator output.

Transistor 81 is of the NPN type, and becomes increasingly conductive as the base becomes increasingly positive with respect to the emitter. The emitter of transistor 81 is connected to ground through resistance 82, and the collector of the transistor is connected to junction 77 through resistance 83. It should be noted that the collector circuit of transistor 81 shunts capacitor 76 and therefore the conductive state of transistor 81 can control the charging time of capacitor 76.

The signal which varies in accordance with the generator potential is derived through transformer 20, diodes 23 and 24, and resistances 25 and 26, a circuit previously described in FIG. 1 and shown again in FIG. 4. The signal appearing at connector B is a series of half sinusoids which is characteristic of a full-wave rectified signal. The base of transistor 81 is connected to the movable tap of resistance 26 through connector B, Zener diode 84 and a lead-lag circuit including capacitors 85 and 65 and resistances 87 and 88. The lead-lag network is essentially an integrater circuit formed by resistance 88 connected in parallel with capacitance 86 between the base of transistor 81 and ground. The lead portion of the lead-lag circuit is formed by the parallel connection of resistance 87 across capacitor 85, this parallel combination being connected in series with the base of transistor 81.

A synchronizing time base signal is supplied to the base-emitter circuit of transistor 81 through isolating resistance 89 connected to the junction between capacitors 38 and 39 in FIG. 1 via connector A. Capacitors 38 and 39 form a capacitor voltage divider and therefore the signal appearing at connector A is proportional to the emitter potential and has a wave form as shown in FIG. 2c. Thus, the synchronizing time base signal applied to the emitter of transistor 81 via resistance 89 in FIG. 4 is a saw-toothed wave which begins increasing in potential immediately following the output pulse developed by turn-off circuit 19. The collector-emitter circuit of transistor 81 has a very high impedance and therefore the synchronizing time base signal has little effect upon this circuit. However, the low impedance base-emitter circuit is affected considerably and therefore so is the conductive state of transistor 81. Thus, as the synchronizing time base signal becomes increasingly positive, the base-emitter potential of transistor 81 is decreased and therefore the conductivity of the transistor is also decreased.

Assume first that the generator output potential is of the desired value. Under these circumstances, the peak voltage of the signal applied to Zener diode 84 exceeds the breakdown potential of the Zener diode for a portion of each half-cycle and therefore some current flows through the base-emitter circuit of transistor 81. The lag network, including capacitor 86, filters the signal and limits the magnitude of changes resulting from minor error perturbations. The lead network, including capacitor 85, permits the transistor base current to respond very rapidly to high rate changes in generator output potential. In effect, the lead or rate network permits the regulator to anticipate final values on the basis of rise rates. Due to the capacity coupling, however, the steady-state effective values are relatively unchanged. The base-emitter current flowing through Zener diode 84 tends to maintain a constant conductive state in transistor 81, but as the saw-toothed potential applied to the emitter of transistor 81 becomes more positive, the transistor's conductivity decreases. Accordingly, transistor 81 provides less shunting effect across capacitor 76, so that some time during the half-cycle, preferably at approximately the middle of the half cycle, capacitor 76 charges up to a potential sufficient to turn on unijunction transistor 70. When the unijunction transistor turns on, capacitor 76 very rapidly discharges, developing a potential pulse across inductance 79.

If the generator output potential increases in magnitude, the base-emitter current flowing through Zener diode 84 increases and therefore the shunting effect of transistor 81 also increases. The increased shunting effect causes capacitor 76 to charge more slowly and therefore the output pulse developed across inductance 79 appears at a later time during the half-cycle. If, on the other hand, the generator output potential decreases, current flow through transistor 81 decreases and the impedance of the collector-emitter circuit of transistor 81 increases. Accordingly, the shunt effect of transistor 81 is less and therefore capacitor 76 charges more quickly and the output pulses developed by the circuit occur earlier in the half-cycle.

Controlled rectifier 12 in FIG. 1 is turned off at the completion of the half-cycle of the generator output potential. If the signal developed acrosss inductance 79 is applied to the gate element of controlled rectifier 12, this controlled rectifier is turned on early in the half-cycle if the generator output potential is low, and is turned on late in the half-cycle if the generator output potential is high. It is seen, therefore, that the generator output potential is controlled in servo fashion by controlling the time duration of the energizing pulse applied to field winding 8.

Capacitor 90 is connected to resistance 74 and to the base-one element 33 of unijunction transistor 32 shown in FIG. 1 through connector E. When turn-off circuit 19 develops an output pulse, this positive pulse is transmitted through capacitor 90 to increase the potential across the interbase circuit of unijunction transistor 70. This increased interbase potential momentarily increases the peak point voltage of unijunction transistor 70 and prevents this transistor from firing while turn-off circuit 19 is developing an output pulse.

It is desirable that the generator field turn-on circuit shown in FIG. 4 not develop more than one output pulse during each half-cycle as the additional pulses may cause ambiguous results. Resistance 91 in series with diode 92 is connected between junction 77 and the junction between generator controlled rectifier 12 and the generator field winding 7 through connector D. This circuit acts as a proportional feedback circuit and serves to lower the potential at junction 77 once controlled rectifier 12 has been turned on. Under these circumstances, it is unlikely that capacitor 76 could charge up sufficiently to provide a second pulse through unijunction transistor 70 until controlled rectifier 12 has been turned off.

Figure 5:
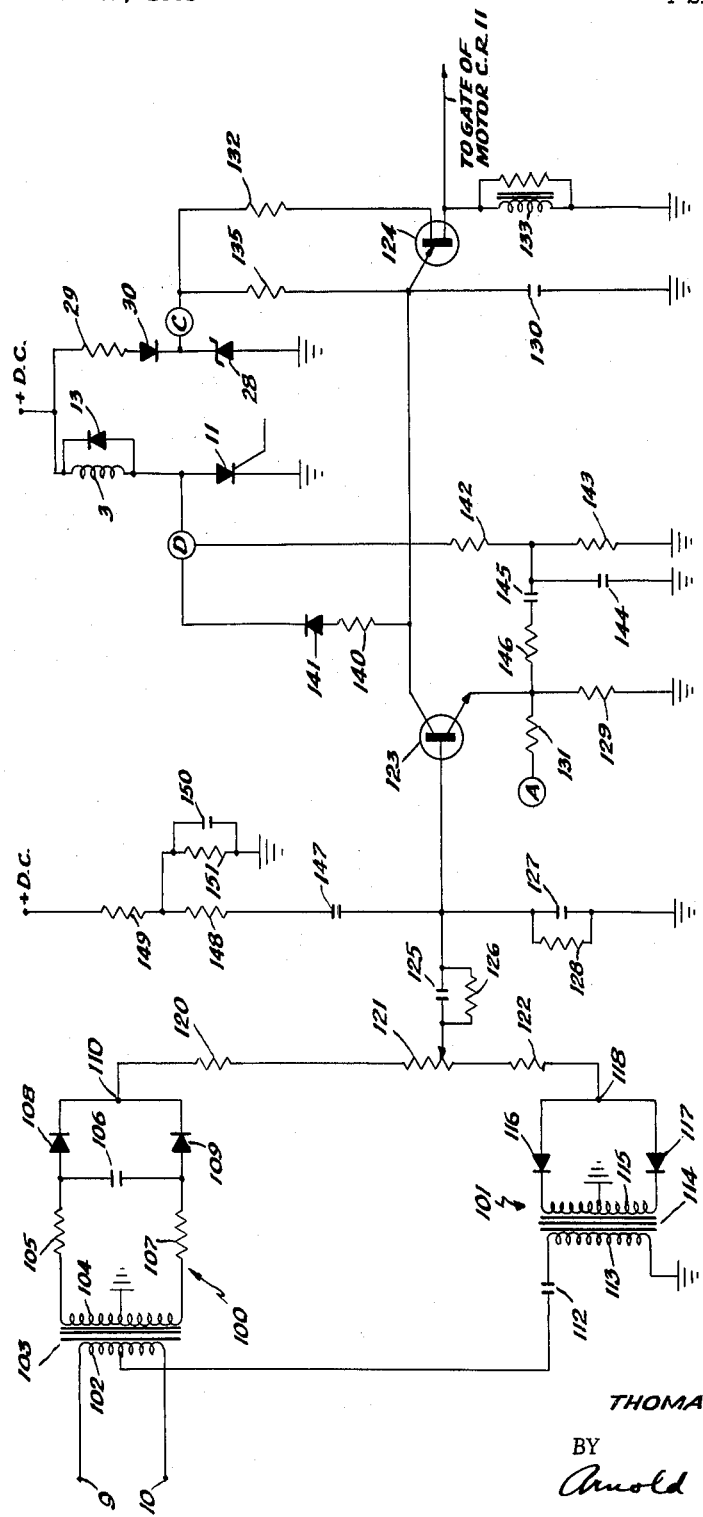

The motor field turn-on circuit is shown schematically in FIG. 5. The purpose of this circuit is to develop an output pulse for turning on the motor controlled rectifier 11. If the generator output frequency is too high, the pulse should appear earlier in each half-cycle to increase motor field energization and reduce speed of rotation. Conversely, if the generator output frequency is too low, the pulse should appear later in the half-cycle to decrease the motor field energization and increase the speed of rotation.

The frequency sensing circuit includes an RC circuit 100 connected in series with an LC circuit 101 connected across the generator output. Transformer 103 has a grounded center tap secondary winding 103 and a tapped primary winding 102 connected across the generator output potential. In practice, the number of components employed could be reduced by connecting the LC and RC circuits across transformer 20, shown in FIG. 1, by including a tap in primary winding 22, instead of employing a separate transformer 103.

Resistance 105, capacitance 106 and resistance 107 are connected in series and between the ends of secondary winding 104. In effect, these three components make up a series resistance capacitance circuit. The potential appearing across capacitor 106 is full-wave rectified by diodes 108 and 109 to provide at junction 110 a direct current potential proportional to the alternating current potential appearing across capacitor 106. The potential at junction 110 varies with frequency, as shown by curve 111 in FIG. 6.

A capacitor 112 is connected in series with high impedance iron core inductance 113 (with air gap) to form a series resonant LC circuit. Capacitor 112 is connected to a tap on primary winding 102, primary winding 102 acting as an autotransformer to reduce the potential applied to capacitor 112. The parameters of the series LC circuit are so designed that the resonant frequency is approximately 20% higher than the contemplated operating frequency of the alternating current generator. Therefore, as the generator output frequency increases toward the resonant frequency of the LC circuit, the potential developed across inductance 113 increases.

Inductance 113 forms a portion of a combination inductor-transformer 114 which includes a center-tap-grounded secondary winding 115, windings 113 and 115 being wound on the same core, the core having a symmetrically located air gap of predetermined size. The signal appearing on secondary winding 115 is proportional to that on primary winding 113 and, therefore, when full-wave-rectified through rectifiers 116 and 117, provides a direct current potential at junction 118 which varies in accordance with curve 119, FIG. 6. The winding ratio between the primary and secondary establishes an impedance match for optimum energy transfer from the high impedance LC circuit to the low impedance input circuit for transistor 123.

The RC and LC circuits 100 and 101 are connected in series opposition by means of the series-connected resistances 120–122. Diodes 108, 109, 116 and 117 are so oriented that current flows from junction 110 to junction 118, junction 110 thus being positive relative to junction 118. The parameters of the RC and the LC circuit are such that at the resonant frequency the LC circuit provides approximately 135° time lead and the RC circuit lags by approximately 45°. Thus, when the outputs of the LC and RC circuits are combined, the output potentials are 180° out of phase. The rectified voltages from the LC and RC circuits are thus synchronized but of opposite polarity so that, when combined, the A.C. components thereof are opposed and balance out, simplifying filtering operations. It is to be noted that there is some significant wave-form cleanup as a result of the semi-resonant nature of the LC circuit, as well as an essentially equal wave-form cleanup in the RC circuit because the output voltage there is derived from the capacitor. The overall effect is to reduce sensitivity of the system to changes in alternator wave-form.

At very low frequencies, capacitances 106 and 112 provide very high impedance while inductance 113 provides a very low impedance. Under these circumstances, the largest portion of the potential drop appears across capacitor 112 and therefore the potential at the tap on variable resistance 121 is highly positive. As the frequency increases, the impedance of capacitances 106 and 112 increases and the impedance of primary winding 113 increases and therefore the potential at the center tap of resistance 121 decreases. As the frequency approaches the resonant frequency of the LC circuit, the impedance of the LC approaches a minimum value and therefore the potential at the output of resistance 121 reaches a minimum positive potential. Thus, it is seen that the potential at the adjustable tap on resistance 121 decreases as the frequency increases toward the resonant frequency of the LC circuit.

Figure 6:
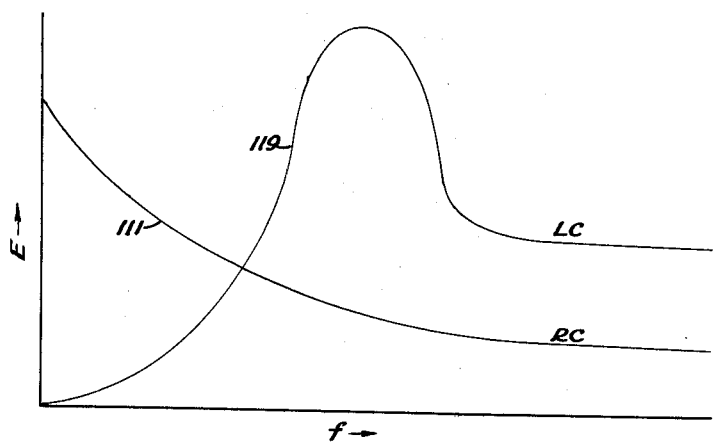
FIG. 6 is a graphic diagram illustrating the relationship between voltages occurring in the circuit of FIG. 5.

Potentiometer 121 is employed as a dual adjustable resistor to selectively vary the total effective resistance in the LC and RC portions of the system. When the adjustable tap of potentiometer 121 is moved toward the LC circuit, as viewed in FIG. 5, the total resistance in the LC portion of the system is reduced and the total resistance in the RC portion is increased by the same amount. This makes the LC circuit more effective and the RC circuit less effective so that the magnitude of the values of curve 119, FIG. 6, is increased and the magnitude of the values of curve 111 decreased, the net result being a reduced frequency. Moving the adjustable tap toward the RC circuit, as viewed in FIG. 5, has the opposite effect, resulting in increased frequency.

Since the speed of the motor is determined by the point at which curves 111 and 119 have essentially the same value, and since the proportions of the two curves are varied by adjusting potentiometer 121, it will be understood that potentiometer 121 constitutes a speed control resistance.

It is to be noted that the LC and RC circuits, though operating from the same power source, are independently acting circuits arranged to feed transistor 123 in parallel via potentiometer 121.

The temperature effect on transformer secondary 104 and capacitor 105 is compensated by making either or both resistances 120 and 122 temperature responsive to make the LC circuit function with the desired relation with temperature.

Transistors 123 and 124 develop the pulse for turning on the motor controlled rectifier in accordance with this frequency variable signal. These circuits are, in many respects, essentially the same as the circuits including transistors 81 and 70 previously described in FIG. 4.

The frequency variable signal is applied to the base of transistor 123 through a lead-lag network. The lead-lag network includes a lag portion wherein resistance 128 is connected in parallel with capacitance 127 between the base of transistor 123 and ground. The lead portion of this same network includes resistance 126 connected in parallel with capacitance 125, this parallel combination connected in series with the base of transistor 123. Accordingly, transistor 123 is rendered more conductive as the frequency variable signal becomes more positive. The lag portion of the lead-lag network limits the magnitude of the excursion of the output which results from a transient change in the error signal. The lead portion of the network, being capacitively coupled, serves to anticipate required changes on the basis of error rate, but does not materially change the steady-state properties.

The emitter of transistor 123 is connected to ground via resistance 129, and the collector-emitter circuit of transistor 123 is connected in parallel with capacitors 130. Thus, the collector-emitter circuit of transistor 123 effectively shunts capacitor 130 in accordance with the conductive state of the transistor.

A synchronizing signal is applied at the emitter of transistor 123 via resistance 131 by means of connector A from the junction between capacitors 38 and 39 in FIG. 1. The signal applied to the emitter of transistor 123 is a saw-toothed signal which increases in potential as each half-cycle progresses. The saw-toothed signal has little effect on the collector-emitter circuit of the transistor, but substantially affects the conductive state of transistor 123 through the base-emitter circuit. Thus, as the saw-toothed potential becomes more positive, the conductivity of transistor 123 decreases as does the shunting effect across capacitor 130.

The base-two element of unijunction transistor 124 is connected to a fixed reference potential developed across Zener diode 28 via resistance 132 and connector C. The base-one element of this transistor is connected to ground through inductance 133 which has resistance 134 connected in parallel therewith. A resistance 135 is connected in series with capacitance 130, and the series combination is connected across the fixed potential developed across Zener diode 28. When the charge on capacitor 130 reaches the peak point voltage of unijunction transistor 124, the transistor becomes conductive and capacitor 130 discharges through the transistor and inductance 133 to ground. The rate at which capacitor 130 charges, and the time required for developing an output pulse across inductance 133 are controlled by the conductive state of transistor 123, i.e., the shunting effect of transistor 123 across capacitance 130.

The emitter of transistor 124 is connected to the anode of motor controlled rectifier 11 through series connected resistance 140 and diode 141 through connector D. When the motor controlled rectifier 11 is conductive, capacitor 130 is shunted to ground through resistance 140 and diode 141, making it impossible for capacitor 130 to charge to a sufficient value to cause transistor 124 to develop an additional output pulse while the motor controlled rectifier is conductive.

Stability is added in the regulator circuit by feeding a signal proportional to the field winding energization to the emitter of transistor 123. Resistances 142 and 143 are connected in series between ground and one end of the motor field winding through connector D. A capacitor 144 is connected across resistance 143 to bypass the high frequency hash components of the signal across the resistance. The portion of the signal not bypassed by capacitor 144 is supplied to the emitter of transistor 123 through the series connection of capacitor 145 and resistance 146. Thus, any changes in the potential across the motor field winding is reflected back into the base-emitter circuit of transistor 123 to effect the conductive state thereof.

A second stabilizing circuit connected to provide compensation in accordance with changes in the direct current line voltage is connected to the base of transistor 123. This circuit includes a capacitor 147 connected in series with resistances 148 and 149 between the positive direct current line and the base of transistor 123. The parallel combination of capacitance 150 and resistance 151 is connected between the junction of resistances 148 and 149 and ground to bypass unwanted high frequency components of the signal. With this circuit connection, changes in potential of the D.C. line pass through capacitor 147 to alter the conductive state of transistor 123 to compensate for these changes. Resistors 149 and 151 also constitute a potentiometer effective to reduce the D.C. voltage applied to capacitors 147 and 150 to a value such that presently available tantalum capacitors can be employed with an adequate safety margin for high temperature operation.

It is seen that the motor field turn-on circuit provides a pulse which turns on the motor controlled rectifier early in the half-cycle when the frequency is too high, thereby decreasing the field energization to reduce the speed and frequency. Conversely, if the output frequency is too low, the motor controlled rectifier is turned on later in the half-cycle to decrease energization thereby increasing the speed of rotation and the output frequency. Thus, it is seen that the motor field turn-on circuit controls the generator output frequency in servo fashion.

While one particularly advantageous embodiment of the present invention has been described, it is obvious to those skilled in the art that many departures therefrom could be applied without departing from the scope of this invention as pointed out in the appended claims.

What is claimed is:

1. In a regulating system for controlling an inverter of the type comprising a D.C. motor driving an A.C. generator, the combination of
two controlled rectifiers;
circuit means for energizing the field winding of the generator and the field winding of the motor from a source of direct current, whereby one of said controlled rectifiers can be operated to control energization of the field winding of the motor and the other of the controlled rectifiers can be operated to control energization of the field winding of the generator;
a first timing circuit responsive to the alternating output of said generator and connected to render said one controlled rectifier conductive at a time, during each cycle of said output, dependent upon the frequency of said output;
a second timing circuit responsive to said output and connected to render the other of said controlled rectifiers conductive, during each cycle, dependent on the magnitude of said output; and
commutating circuit means being responsive to said output to render both of said controlled rectifiers nonconductive at substantially the same instant during each cycle of said output.

2. In a regulating system for controlling an inverter of the type comprising a D.C. motor driving an A.C. generator, the combination of
a first controlled rectifier connected to control energization of the field winding of the motor from a direct current source;
a first timing circuit responsive to the alternating output of said generator and connected to render said first controlled rectifier conductive at a time, during each half-cycle of said output, dependent upon the frequency of said output;
a second controlled rectifier connected to control energization of the field winding of the generator from said direct current source;
a second timing circuit responsive to said output and connected to render said second controlled rectifier conductive at a time, during each half-cycle of said output, dependent upon the magnitude of said output;
a third controlled rectifier and means for supplying current through said third controlled rectifier when the same is conductive, said third controlled rectifier being connected to pass such current in a direction through said first and second controlled rectifiers to render the same nonconductive; and
a third timing circuit responsive to the alternating output of said generator and connected to render said third controlled rectifier conductive substantially at the end of each half-cycle of said output.

3. In a regulating system for controlling an inverter of the type comprising a D.C. motor driving an A.C. generator, the combination of
a first controlled rectifier connected to control energization of the field winding of the motor from a direct current source;
a first timing circuit responsive to the alternating output of said generator and connected to render said first controlled rectifier conductive at a time, during each half-cycle of said output, dependent upon the frequency of said output;
a second controlled rectifier connected to control energization of the field winding of the generator from said direct current source;
a second timing circuit responsive to said output and connected to render said second controlled rectifier conductive at a time, during each half-cycle of said output, dependent upon the magnitude of said output;
a capacitor;
circuit means timed in accordance with the alternating generator output to supply a pulse of charging current to said capacitor during each half-cycle of said output;
a third controlled rectifier connected, when conductive, to discharge said capacitor so that discharge current flows through said first and second controlled rectifiers in directions to commutate the same; and
a third timing circuit responsive to said alternating output and connected to render said third controlled rectifier conductive substantially at the end of each half-cycle of said output.

4. A regulating system in accordance with claim 3 wherein
a resistor is connected between said capacitor and said direct current source so that
the charging current for said capacitor flows through said resistor and said source, and
the discharging current, after said first and second controlled rectifiers have been commutated, flows through said field windings.

5. In a regulating system for controlling an inverter of the type comprising a D.C. motor driving an A.C. generator, the combination of
a first controlled rectifier connected to control energization of the field winding of the motor from a direct current source;
a first timing circuit responsive to the alternating output of said generator and connected to render said first controlled rectifier conductive at a time, during each half-cycle of said output, dependent upon the frequency of said output;
a second controlled rectifier connected to control energization of the field winding of the generator from said direct current source;

a second timing circuit responsive to said output and connected to render said second controlled rectifier conductive at a time, during each half-cycle of said output dependent upon the magnitude of said output;

a first and a second capacitor;

circuit means timed in accordance with the alternating generator output to supply a pulse of charging current to said first and second capacitors during each half-cycle of said output;

a third controlled rectifier connected between said other controlled rectifier and said capacitors, said third controlled rectifier being operative when conductive
    to discharge said first capacitor through said first controlled rectifier to commutate the same, and
    to discharge said second capacitor through said second controlled rectifier to commutate the same; and a third timing circuit responsive to said output and connected to render said third controlled rectifier conductive substantially at the end of each half-cycle of said output.

6. A regulating system in accordance with claim 5 wherein
one plate of each of said capacitors is connected to a common junction and an impedance device is connected between the other plates of said first and second capacitors so that one of said capacitors can aid the other capacitor in commutating the associated controlled rectifier.

7. In a regulating system for controlling an inverter of the type comprising a D.C. motor driving an A.C. generator, the combination of a first controlled rectifier connected to control energization of the field winding of the motor from a direct current source;

a first timing circuit responsive to the alternating output of said generator and connected to render said first controlled rectifier conductive at a time, during each half-cycle of said output, dependent upon the frequency of said output;

a second controlled rectifier connected to control energization of the field winding of the generator from said direct current source;

a second timing circuit responsive to said output and connected to render said second controlled rectifier at a time, during each half-cycle of said output, dependent upon the magnitude of said output; and a commutating circuit comprising
capacitance means;
charging circuit means connected to operate from the alternating output of the generator to supply a pulse of charging current to said capacitance means during each half-cycle of said output;
circuit means including said capacitance means and an electrical relay device and connected to discharge said capacitance means through said first and second controlled rectifiers to commutate the same in response to operation of said relay device; and
a third timing circuit operating from said output and connected to said relay device to operate the same to discharge said capacitance means substantially at the end of each half-cycle of said output.

8. In a regulating system for controlling an inverter of the type comprising a D.C. motor driving an A.C. generator, the combination of a first controlled rectifier connected to control energization of the field winding of the motor from a direct current source;

a first timing circuit responsive to the alternating output of said generator and connected to render said first controlled rectifier conductive at a time, during each half-cycle of said output, dependent upon the frequency of said output;

a second controlled rectifier connected to control energization of the field winding of the generator from said direct current source;

a second timing circuit responsive to said output and connected to render said second controlled rectifier conductive at a time, during each half-cycle of said output dependent upon the magnitude of said output;

capacitance means;

a third controlled rectifier connected to discharge said capacitance means through said first and second controlled rectifiers to commutate same when said third controlled rectifier is rendered conductive;

a third timing circuit responsive to said output and operatively connected to render said third controlled rectifier conductive substantially at the end of each half-cylce of said output; and charging circuit means connected to operate from said alternating output to supply a pulse of charging current to said capacitance means sufficiently late during each half-cycle of said output so that said third controlled rectifier will be commutated by current starvation at the beginning of each half-cycle of said output by completely discharging said capacitance means.

9. A regulating system in accordance with claim 8 wherein
said charging circuit includes a saturable reactor so connected between said output from the generator and said capacitance means that
    said saturable reactor is being driven toward saturation at the beginning of each half-cycle of said output to thereby block current flow to said capacitance means and
    so that said saturable reactor becomes saturated during each half-cycle of said output to thereafter permit current flow to said capacitance means for the remainder of each half-cycle of said output.

10. A regulating system in accordance with claim 8 further comprising
an impedance device connected between said capacitor and said source of direct current to complete a path for said pulses of charging current through said impedance device and said direct current source.

11. In a control system operating from an A.C. source to periodically commutate at least a first controlled rectifier connected to a D.C. source, the combination of
capacitance means;
a second controlled rectifier connected to discharge said capacitance means through said first controlled rectifier to commutate the same when said second controlled rectifier is rendered conductive;
timing circuit means connected to said A.C. source and operative to render said second controlled rectifier conductive substantially at the end of each half-cycle of said A.C. source;
charging circuit means connected to operate from said A.C. source to supply a pulse of charging current to said capacitance means sufficiently late during each half-cycle of said A.C. source so that said second controlled rectifier will be commutated by current starvation at the beginning of each half-cycle prior to the application of said pulse of charging current.

12. A control system in accordance with claim 11 wherein
said charging circuit includes a saturable reactor connected between said A.C. source and said capacitance means
    so that said saturable reactor is being driven toward saturation at the beginning of each half-cycle to thereby block current flow to said capacitance means, and 13. In a regulating system for controlling an inverter of the type comprising a D.C. motor driving an A.C. generator, the combination of
    a first controlled rectifier connected to control energization of the field winding of the motor from a direct current source;
    a first timing circuit responsive to the alternating output of said generator and connected to render said first controlled rectifier conductive at a time, during each half-cycle of said output, dependent upon the frequency of said output;
    a second controlled rectifier connected to control energization of the field winding of the generator from said direct current source;
    a second timing circuit responsive to said output and connected to render said second controlled rectifier conductive at a time, during each half-cycle of said output, dependent upon the magnitude of said output;
    a third timing circuit connected to render said third controlled rectifier conductive substantially at the end of each half-cycle of said output, and comprising
        a unijunction transistor having
            an interbase circuit such that current flow therethrough determines the peak point voltage for said transistor, and
            an emitter-base circuit which is triggered into conduction when the emitter base potential exceeds the peak point voltage;
        a capacitor connected across said emitter-base circuit;
        circuit means for charging said capacitor; and
        circuit means for applying a signal, rectified from said alternating output, to said interbase circuit so that said peak point voltage is reduced toward the end of each half-cycle thereby triggering said transistor into conduction.

14. In a regulating system for controlling an inverter of the type comprising a D.C. motor and an A.C. generator, the combination of a field winding for said D.C. motor, a field winding for said A.C. generator;
    a pair of relay devices each connected, respectively, to control energization of said motor and generator field windings from a D.C. source;
    timing circuits responsive to the alternating output from the generator and operative via said relay devices
        to initiate energization of said motor field winding at a time, during each half-cycle of said output, dependent upon the frequency of said output, and
        to initiate energization of said generator field winding at a time, during each half-cycle of said output, dependent upon the magnitude of said output, and
    circuit means operative via said relay devices to terminate energization of said field windings substantially at the end of each half-cycle of said output, and comprising
        a unijunction transistor having
            an interbase circuit such that current flow therethrough determines the peak point voltage for said transistor, and
            an emitter-base circuit which is triggered into conduction when the emitter-base potential exceeds the peak point voltage;
        a capacitor connected across said emitter-base circuit;
        circuit means for charging said capacitor; and
        circuit means for applying a signal, rectified from said alternating output, to said interbase circuit so that said peak point voltage is reduced toward the end of each half-cycle thereby triggering said transistor into conduction, said unijunction transistor being coupled to said relay devices and operative, when conductive to cause said relay devices to terminate energization of said field windings at the end of each half-cycle of said output.

15. In a regulating system for controlling energization of the motor field winding in a motor-generator type inverter; the combination of
    a controlled rectifier;
    circuit means for connecting said motor field winding to a source of direct current via said controlled rectifier whereby said controlled rectifier can be operated to control energization of said field winding;
    a timer circuit including a threshold semiconductor device interconnected with a capacitor so that an output pulse is provided to render said controlled rectifier conductive when the potential across said capacitor exceeds a predetermined value;
    a charging circuit for said capacitor;
    a second semiconductor device connected to provide a variable shunt impedance across said capacitor whereby the charging rate of said capacitor is determined in accordance with the conductive state of said second semiconductor device;
    first circuit means responsive to the output of said generator to supply a signal to said second semiconductor device for controlling the conductive state thereof as a function of said output;
    second circuit means for supplying to said second semiconductor device a synchronizing time base signal in the form of a saw-toothed wave; and
    third circuit means for periodically rendering said controlled rectifier nonconductive.

16. A regulating system in accordance with claim 15 adapted to control energization of the motor field winding, wherein
    said signal supplied to said second semiconductor device via said first circuit means is a function of the frequency of the alternating output from said A.C. generator;
    said synchronizing signal supplied to said second semiconductor via said second circuit means completes a cycle during each half-cycle of said alternating output; and
    said third circuit means is operative to render said controlled rectifier nonconductive substantially at the end of each half-cycle of said alternating output.

17. In a regulating system for controlling an inverter of the type comprising a D.C. motor driving an A.C. generator, the combination of
    two controlled rectifiers;
    circuit means for energizing the field winding of the generator and the field winding of the motor from a source of direct current, whereby one of said controlled rectifiers can be operated to control energization of the field winding of the motor and the other of the controlled rectifiers can be operated to control energization of the field winding of the generator;
    a pair of circuit means each connected to a different one of said controlled rectifiers and operative to render the same conductive at a time, during each half-cycle of the output from said generator, dependent upon the magnitude of a signal applied thereto;
    a first connecting circuit for connecting one of said circuit means to the output of said generator so that the controlled rectifier controlling energization of the generator field winding is rendered conductive at a time during each half-cycle dependent upon the mangnitude of the generator output;
    a second connecting circuit including a series resonant circuit having an output and tuned for resonance at a frequency substantially in excess of the desired frequency of said generator output;

a capacitive circuit having an output;

connecting means for coupling said series resonant circuit and said capacitive circuit to the output from said generator;

a pair of full-wave rectifying circuits, each connected respectively to the outputs of said resonant circuit and said capacitive circuit;

combining circuit means connected via said rectifying circuits to combine the full-wave rectified output signal from said series resonant circuit with the full-wave rectified output signal from said capacitive circuit to derive a D.C. control signal which varies as a function of generator frequency; and means connecting said combining circuit to said other circuit means so that the controlled rectifier controlling energization of said motor field winding is rendered conductive at a time during each half-cycle dependent upon the frequency of said generator output; and means for commutating both of said controlled rectifiers subtantially at the end of each half-cycle of said output.

18. In a regulating system for controlling energization of the field windings of an A.C. generator; the combination of a controlled rectifier; circuit means for connecting said generator field winding to a source of direct current via said controlled rectifier whereby said controlled rectifier can be operated to control energization of said field winding; a timer circuit including a threshold semiconductor device interconnected with a capacitor so that an output pulse is provided to render said controlled rectifier conductive when the potential across said capacitor exceeds a predetermined value; a charging circuit for said capacitor; a second semiconductor device connected to provide a variable shunt impedance across said capacitor whereby the charging rate of said capacitor is determined in accordance with the conductive state of said second semiconductor device; first circuit means responsive to the magnitude of the alternating output of said generator to supply a signal to said second semiconductor device for controlling the conductive state thereof as a function of said output; second circuit means operative to supply to said second semiconductor device a synchronizing time base signal during each half-cycle of said alternating output to cyclically control the conductive state thereof; and third circuit means for periodically rendering said controlled rectifier nonconductive.

19. In a regulating circuit for controlling field winding energization of a D.C. motor driving an A.C. generator so as to maintain a constant frequency output from said generator, the combination of a series resonant circuit tuned for resonance at a frequency substantially in excess of the desired frequency of said output; a capacitive circuit; connecting means for coupling said series resonant circuit and said capacitive circuit to the output from said generator; first means for translating the A.C. output signal of said series resonant circuit into a first D.C. signal; second means for translating the A.C. output signal of said capacitive circuit into a second D.C. signal; combining circuit means connected to said first and second translating means and operative to combine said first and second D.C. signals to derive a composite D.C. control signal which varies as a function of generator frequency; and circuit means connected to control energization of the motor field winding from a D.C. source in accordance with said control signal.

References Cited by the Examiner

UNITED STATES PATENTS

| 2,284,649 | 6/1942 | Grabau | 321—28 X |
| 2,925,546 | 2/1960 | Berman | 323—22 |

OTHER REFERENCES

G.E. Controlled Rectifier Manual, first edition, March 21, 1960, pages 55, 56.

LLOYD McCOLLUM, *Primary Examiner.*